United States Patent [19]
Boydston

[11] 3,839,980
[45] Oct. 8, 1974

[54] AIR CUSHION SEALING
[76] Inventor: Edward A. Boydston, P.O. Box 971, Reno, Nev. 89504
[22] Filed: Feb. 23, 1973
[21] Appl. No.: 335,433

[52] U.S. Cl.............................................. 114/67 A
[51] Int. Cl............................................... B63b 1/38
[58] Field of Search .............. 114/67 A, 61; 115/11

[56] References Cited
UNITED STATES PATENTS
| | | | |
|---|---|---|---|
| 3,342,032 | 9/1967 | Cox et al..................... | 114/67 A UX |
| 3,664,289 | 5/1972 | Boydston..................... | 114/67 A |
| 3,702,598 | 11/1972 | Szptyman..................... | 114/67 A |

Primary Examiner—Trygve M. Blix

[57] ABSTRACT

Sealing is effected in an air cushion vehicle by creating a jump wave and following the jump wave with a sealing device, which moves forward and upward at lower vehicle speeds in high seas and which moves rearward and downward in low seas at higher vehicle speeds with uniform power. Sealing is augmented and effected by propulsion-created spray and by spray ricocheting from the jump wave.

11 Claims, 9 Drawing Figures

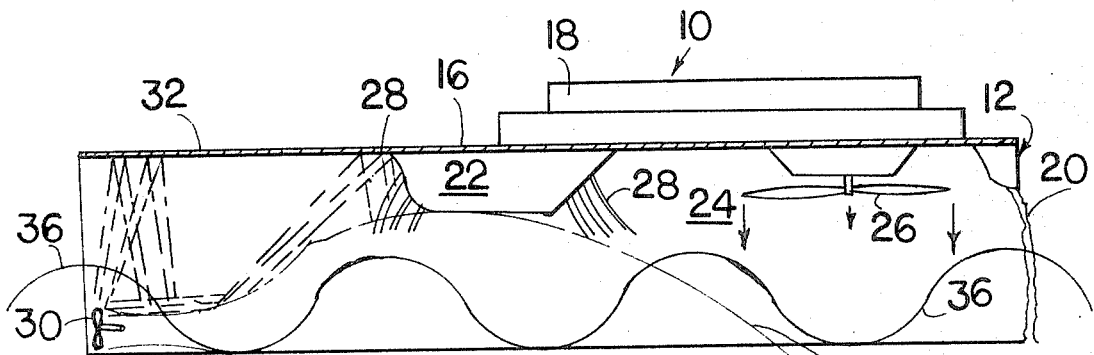
FIG_1
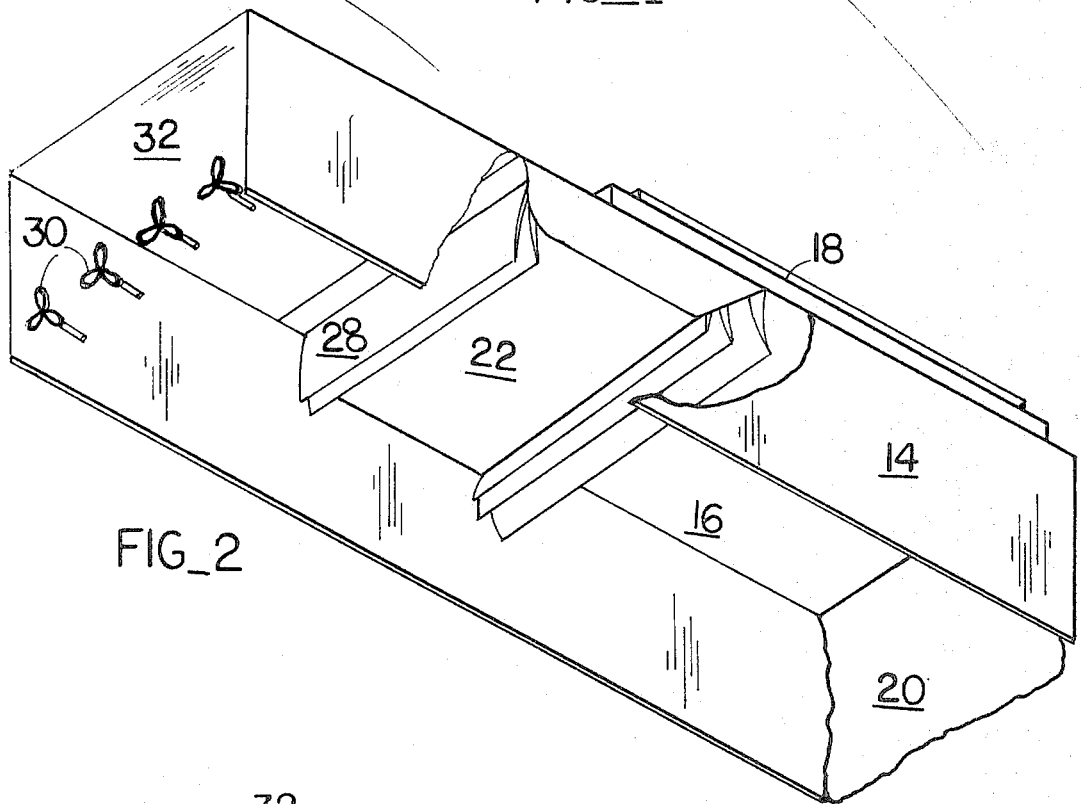
FIG_2
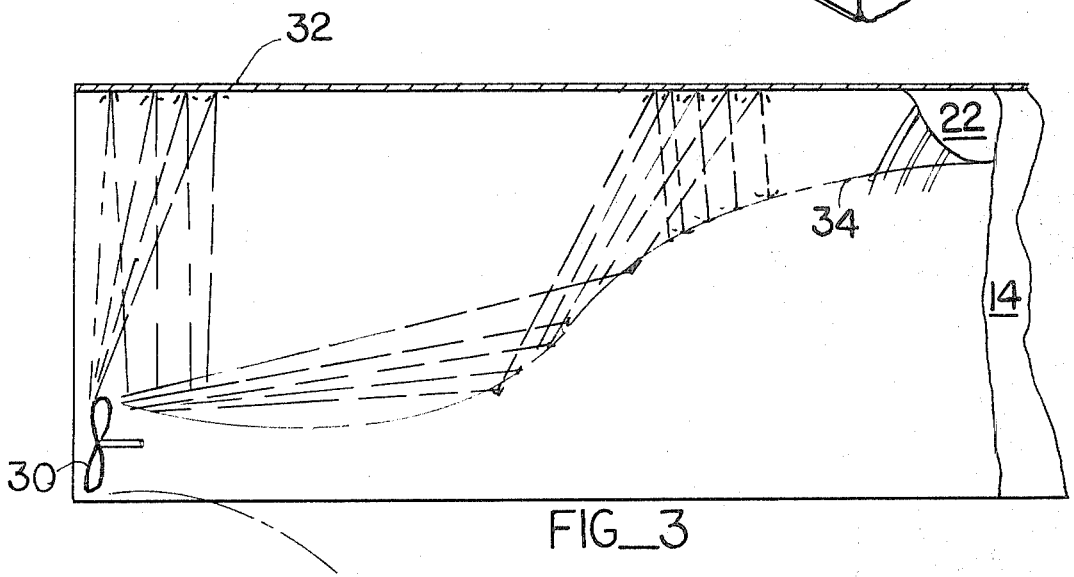
FIG_3

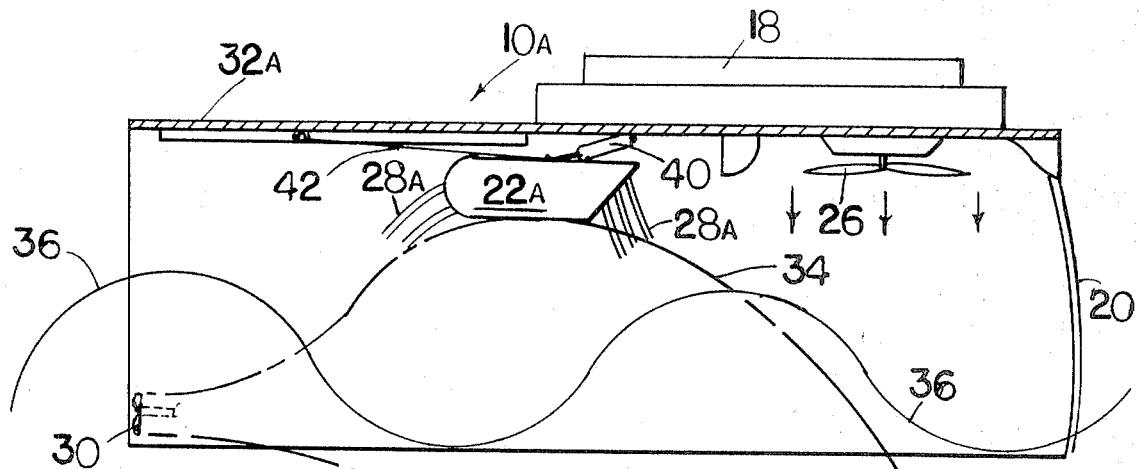
FIG_4
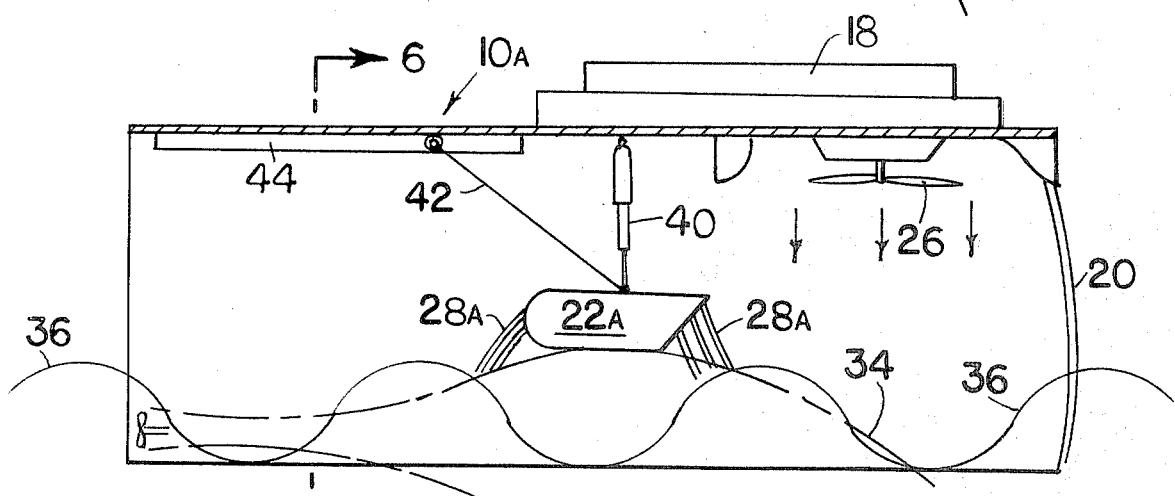
FIG_5
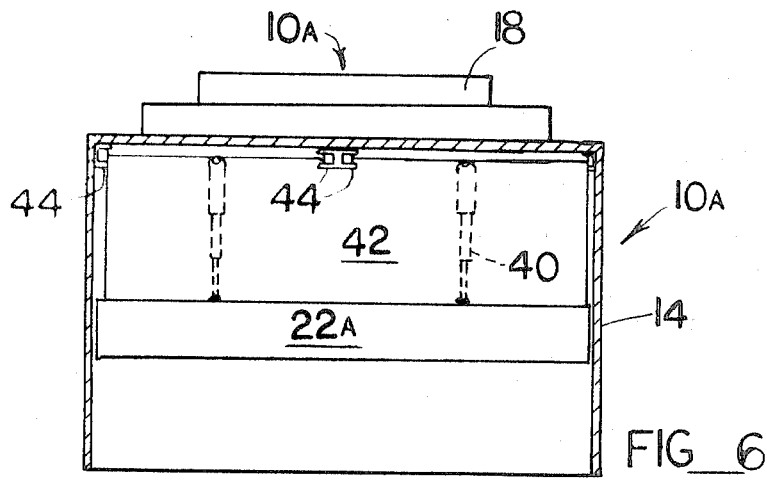
FIG_6

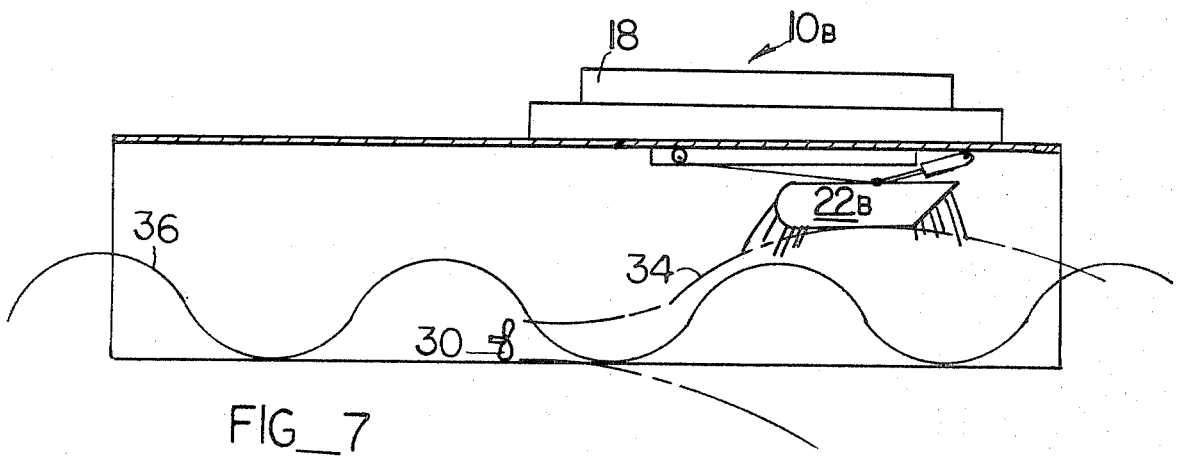
FIG_7
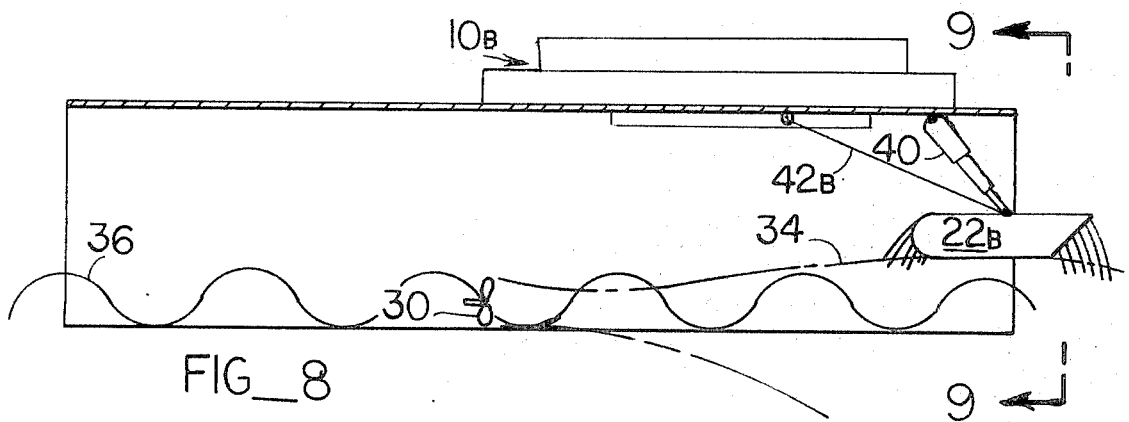
FIG_8
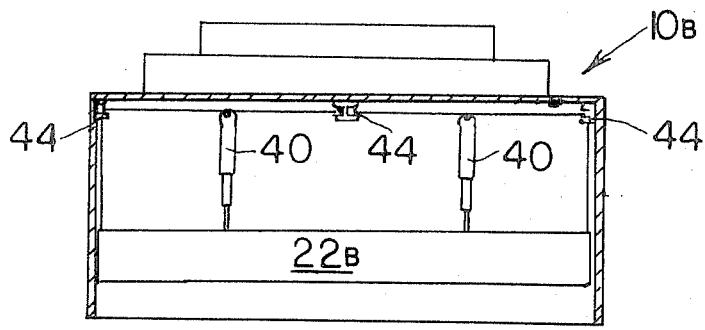
FIG_9

3,839,980

AIR CUSHION SEALING

BACKGROUND OF THE INVENTION

This invention relates to captured air cushion vehicles which are also referred to as surface effect ships or air cushion vessels.

An air cushion vehicle was disclosed in U.S. Pat. No. 3,664,289. The vehicle has increased stability and reliability to create and control a hydraulic jump wave that seals the front of the air cushion as the vehicle is moving. A jump wave is defined as the wave created aft of a propulsion system due to the pushing of water rearward. Air is trapped beneath the vehicle so that its pressure builds up to a level higher than ambient air pressure, thereby maintaining a force to raise the vehicle and keep its major hull above the water.

The air cushion vehicle described in that patent operates successfully by virtue of the hydraulic jump wave created by the front propulsion units. Under variable surface wave or sea state conditions a larger or smaller jump wave may be required to close the gap at the front of the vehicle and provide the desired sealing for the air cushion. To compensate for this variable surface wave condition, it has been necessary to control the jump wave to maintain an adequate seal of the air cushion space under the vehicle. The sealing system of the present invention is useful with all know types of air cushion vehicles, such as, for example, well known sidewall type craft typified by Hovermarine HM-2 sidewall craft and soft or cushion wall craft typified by Hovercraft VT-1.

SUMMARY OF THE INVENTION

A general object of the present invention is to provide improved vehicles with air cushions which are confined by moveable seals on jump waves. A second object of the invention is to provide spray seals and ricocheting spray seals.

Another more specific object of the present invention is to provide an air cushion vehicle that is constructed so that a front propulsion unit not only creates a hydraulic jump wave but also forms a water spray pattern which deflects from vehicle structure or from the jump wave to thereby seal or further increase the seal around the air cushion.

Another object of the present invention is to provide an air cushion vehicle that can be operated in seas of different surface intensity and wave size with essentially the same efficiency.

Another object of the present invention is to provide an air cushion vehicle that can control the actual size of the open side of the air cushion space as the vehicle is moving, so that it can be efficiently sealed by the hydraulic jump wave.

In broad terms, the present invention comprises an air cushion type water vessel having a generally channel shaped hull with opposite side portions that form an air chamber under the vessel. Forwardly and rearwardly of the chamber are openings through which water can pass as the vessel moves ahead. These openings are maintained substantially closed to air flow, so that air will be confined within the chamber to form a cushion of sufficient pressure to raise the vessel above the water's surface, thereby reducing surface friction of the vessel to a very low value, as compared to vessels which have their hulls in contact with the water. Extending forwardly between the sides of the vessel is its driving means, such as a series of engine driven propellers or water jets that provide a forward motion force while simultaneously creating a hydraulic jump wave that moves rearwardly between the vessel sides. On the underside of the hull between the vessel sides and aft of the driving means is an enlarged transverse sealing member. This member may be fixed just forward of the air cushion chamber, or it may be adjustable to various vertical positions to accomodate hydraulic jump waves of different heights and varying surface wave conditions. With this adjustable transverse sealing member, the vessel can operate at varying speeds, with jump waves of different heights and under varying surface wave conditions with the air cushion chamber properly and efficiently sealed by the jump wave at all times. Structural features harness and employ sprays and deflected sprays from the propulsion means to effect and to augment air cushion sealing.

Other objects, advantages and features of the present invention are apparent from the written description and from the accompanying drawings.

BRIEF DESCRIPTION OF THE DRAWINGS

FIG. 1 is a partially schematic view in elevation and in section showing spray deflection and sealing in an air cushion vehicle.

FIG. 2 is a schematic perspective view of the vehicle shown in FIG. 1, with portions broken away.

FIG. 3 is an enlarged schematic view in section showing the forward portion of the vehicle of FIG. 1.

FIG. 4 is a schematic view showing an air cushion vehicle having an adjustable sealing member forward of the air cushion chamber.

FIG. 5 is a schematic view showing the adjustable sealing member in an extended position.

FIG. 6 is a sectional schematic view taken along line 6—6 of FIG. 5.

FIG. 7 is a schematic view showing an air cushion vehicle having an adjustable sealing member at its stern with the hydraulic jump wave employed to seal the stern of the vehicle.

FIG. 8 is a schematic view showing the vehicle of FIG. 7 with the adjustable sealing member in a downward and rearward extended position.

FIG. 9 is a view in section taken along line 9—9 of FIG. 8.

DETAILED DESCRIPTION OF THE DRAWINGS

With reference to the drawings, FIGS. 1 and 2 schematically illustrate air cushion vehicle 10. Vehicle 10 has a channel-shaped hull 12 having opposite side walls 14 connected by a transverse hull section 16. A cabin or superstructure is indicated by numeral 18. Fixed to the stern end of the vehicle is an enlarged flotation hull portion with a flexible skirt 20 that extends downward and engages the water surface when the vehicle is in operation.

Spaced forwardly from the stern and fixed to the underside of the transverse hull section 16 is a transverse sealing member 22 that extends downwardly toward the water surface. The lower surface of sealing member 22 terminates above the level of the surrounding water surface when the vehicle is in operation. This transverse sealing member is water tight and is of light construction so that it affords flotation and support for the vehicle when it is at rest in the water. Sealing member 22, stern wall 20 and side walls 14 form an air cushion chamber 24. Air pressure is increased by a rotating fan or propeller 26 driven by some suitable power source. Attached to forwardly and rearwardly extending sloped surfaces on the transverse sealing member are a series of flexible skirt members 28 that help to maintain a front air seal for the chamber 24 of the vehicle 10.

Extending forwardly from the transverse sealing member 22 are a series of driving propellers 30 that are driven through a conventional mechanical, hydraulic, or electrical drive system by a suitable power source that may be supported on the main hull. Driving propellers 30 are aligned side by side in a line that extends transversely between the side walls 14 near the bow of the vehicle. Directly above these propellers is a forwardly extended shroud portion 32 of the hull that serves as a deflector. Deflector 32, as shown in FIG. 3, receives and deflects the water kicked up by the propellers and utilizes the energy of this deflected water to help in sealing the forward end of the air cushion chamber 24. The deflected water seals and adds to the main sealing effect provided by the hydraulic jump wave produced by the driving propellers 30.

As shown in FIG. 1, the hydraulic jump wave is designated by the dotted line bearing numeral 34, while the surrounding surface waves are indicated by the light solid line 36. The propellers 30 are located forwardly from the transverse sealing member 22 by a distance that normally causes the hydraulic jump wave produced to crest right under the transverse member 22. Since this hydraulic wave remains substantially stationary, it establishes a good air seal. Variations in the size of the jump wave imposed by surface water conditions are compensated for by the flexible members 28 and the spray energy conservation afforded by the deflecting forward shroud 32.

In operation, the vehicle 10, at rest is supported in the water by suitable flotation portions of the hull 16 so that within the chamber 24 the fan 26 is above the water surface. When the fan is turned on, air pressure is built up within the chamber 24 and this causes the vehicle to rise on the air cushion confined by the sides 14, the stern member 20 and the skirt members 28 of the transverse member 22.

Propellers 30 move the ship forward and create a hydraulic jump wave 34. The crest of jump wave 34, which occurs at the transverse member 22, effectively seals the forward end of the chamber 24. The sealing is aided by the water kicked up by the propellers, which is deflected rearwardly by the shroud 32.

Another air cushion vehicle 10a, embodying principles of the present invention, is shown schematically in FIGS. 4–6. A transverse sealing member 22a is movable by means of a controllable actuating mechanism to various vertical and horizontal positions. Seal 22a moves rearward and down, when the sea state is reduced, and when vehicle speed is increased, while power is maintained constant. Seal 22a moves forward and up in vehicles at high sea state and low speed conditions. Height of the jump wave is increased, and its length is shortened when power is maintained and when the vessel is slowed by high seas.

Sealing member 22a is an elongated, relatively light and watertight structure having a generally uniform cross section. Leading and trailing edge portions have attached flexible skirt members 28. Attached to the top of the member 22a at spaced apart intervals are a series of linear actuators 40. The other ends of these actuators are pivotally connected to the transverse hull portion of the ship. A lower edge of flexible sealing curtain member 42 is attached to the top of the member 22a. An upper end of sealing curtain 42 is slidably retained by guide rails 44 fixed to the underside of the shroud portion 32a. The guide member 42 is in the form of a sheet or screen member having end portions, as shown in FIG. 6, that are retained in the guide rails 44. As the sealing member 22a is lowered by the actuators 40, the gap that is created between the sealing member and the inside surface of the intermediate hull portion 16 is automatically closed by the sheet members 42, and air cannot flow from chamber 24. The remaining structure of the ship 10a may be essentially the same as shown for the ship 10.

In the ship designated by the numeral 10b shown in FIGS. 7–9, a hydraulic jump wave 34 is created at the stern and a movable transverse sealing member 22b is provided at the stern. The structure of the member 22b and its actuation mechanism is similar to that as described for the ship 10a. Driving propellers 30 are positioned further aft and are driven by means of a power plant located forward. The adjustment in the height of the transverse sealing member 22b can be made by controlling its actuators when the hydraulic jump wave increases and moves forward or decreases and moves aft at variable speeds and when the surface waves vary in size due to local conditions. A sealing curtain 42b completes the rear air cushion seal. The shape of the bow causes ram air to be imprisoned in the hull, providing the air cushion which is sealed rearward by members 22b and 42b.

It will be obvious to those skilled in the art that changes in construction and varied applications of the invention may be employed without departing from the spirit and scope of the invention. The scope of the invention is defined in the following claims.

I claim:

1. An air cushion vehicle comprising
a hull having a main deck with spaced apart wall means that extend downward from said hull to water level, sealing means extending transversely between said wall means which together form a cavity under the main deck for retaining a supporting body of air which is an air cushion;

means for supplying air to said cavity at a pressure which is higher than ambient air pressure; forward extending shroud means comprising the main deck and side walls extending forwardly from said hull over and above the water level and forming a channel-shaped inlet to said cavity, for entrapping water flung upwardly to form a seal within the forward extending shroud means thrust means supported within said inlet forward of the hull beneath the shroud means and extending forwardly of said sealing means for producing an underwater forward thrust to said vehicle and simultaneously a rearward thrust to water, which rearward thrusted water is urged upward within said inlet under said forward extended main deck of said hull, thereby forming a seal.

2. An air cushion vehicle comprising:
a hull having a main deck with spaced apart wall means that extend to water level, sealing means comprising a movable buoyant structural section attached to the underside of said main deck and extending transversely between said wall means, which together form a cavity under the main deck for retaining a supporting body of air which is an air cushion;

means for supplying air to said cavity at a pressure which is higher than ambient air pressure;

shroud means extending forwardly from said hull over said thrust means and forming a channel-shaped inlet to said cavity thrust means supported within said inlet and extending forwardly of said sealing means for producing an underwater forward thrust to said vehicle and simultaneously a rearward thrust to water, which rearward thrusted water is urged upward under said main deck of said hull.

3. The air cushion vehicle of claim 2 including moving means attached to said sealing means for moving it vertically to a predetermined adjustable position so that it engages and forms a seal with a crest of a hydraulic jump wave produced by said thrust means.

4. The air cushion vehicle of claim 2 including means attached to the sealing means for moving it horizontally to a predetermined adjustable position.

5. The air cushion vehicle of claim 2 wherein the sealing means wherein the movable buoyant structural section is mounted beneath a stern of the vehicle and further comprising means for moving said buoyant section vertically and horizontally to preselected adjustable positions, so that the section engages and forms a seal with the crest of a hydraulic jump wave produced by said thrust means near the stern of the vehicle.

6. The air cushion vehicle of claim 5 wherein a front of the cavity is open to provide ram pressurized air to the cavity.

7. The air cushion vehicle of claim 3 wherein said moving means comprises a plurality of linear actuators pivotally connected to said buoyant section and to the underside of the said hull, further comprising a sheet-like transverse deflector member extending between said sidewall members forward of said actuators.

8. The air cushion vehicle of claim 7 including means for varying the angular position of said sheet-like member as said buoyant section is raised or lowered.

9. The air cushion vehicle of claim 1 wherein the sealing means comprises a stern sealing means near a stern of the vehicle, and a forward sealing means positioned rearward of the thrust means.

10. The air cushion veihicle of claim 9 wherein the forward sealing means comprises spray flung upward from the thrust means against a bottom of the shroud means.

11. The air cushion vehicle of claim 9 wherein the thrust means produces a jump wave and wherein the forward sealing means comprises spray flung rearward by the thrust means and impinging on the jump wave and ricocheting upward therefrom against a bottom of at least one of the main decks and the shroud means.

* * * * *